United States Patent [19]

Balembois

[11] Patent Number: 5,076,890
[45] Date of Patent: Dec. 31, 1991

[54] METHOD FOR PULP QUALITY CONTROL AND REGULATION

[75] Inventor: Claude Balembois, Brussels, Belgium

[73] Assignee: Dorr-Oliver Incorporated, Milford, Conn.

[21] Appl. No.: 485,677

[22] Filed: Feb. 27, 1990

[30] Foreign Application Priority Data

Mar. 16, 1989 [BE] Belgium ............................ 08900292

[51] Int. Cl.⁵ .............................................. D21F 1/08
[52] U.S. Cl. .................................... 162/198; 162/258; 162/263; 162/DIG. 11; 73/63; 210/740; 210/96.1; 417/43; 417/12
[58] Field of Search ....... 162/198, 258, 263, DIG. 10, 162/DIG. 11; 73/61 R, 63; 417/900, 43, 12; 210/137, 96.1, 740

[56] References Cited

U.S. PATENT DOCUMENTS

| | | | |
|---|---|---|---|
| 2,627,788 | 2/1953 | Staege | 162/258 |
| 3,186,215 | 6/1965 | Danforth | 162/258 |
| 3,368,392 | 2/1968 | Miller | 73/63 |
| 3,538,749 | 11/1970 | Danforth | 162/198 |
| 4,680,957 | 7/1987 | Dodd | 162/258 |
| 4,705,462 | 11/1987 | Balembois | 417/395 |

Primary Examiner—Richard V. Fisher
Assistant Examiner—Todd J. Burns
Attorney, Agent, or Firm—Harold M. Snyder

[57] ABSTRACT

The present invention relates to a method of qualitative and quantified monitoring of the instant local physical state of a substantially incompressible fluid material such as a liquid or pasty substance (for instance slurry or pulp) and a device for carrying out this method and the various applications and uses resulting from the working of the method and/or device for the automatic control of said physical state. The invention is also directed to the various equipment and systems provided with at least one such device.

6 Claims, 5 Drawing Sheets

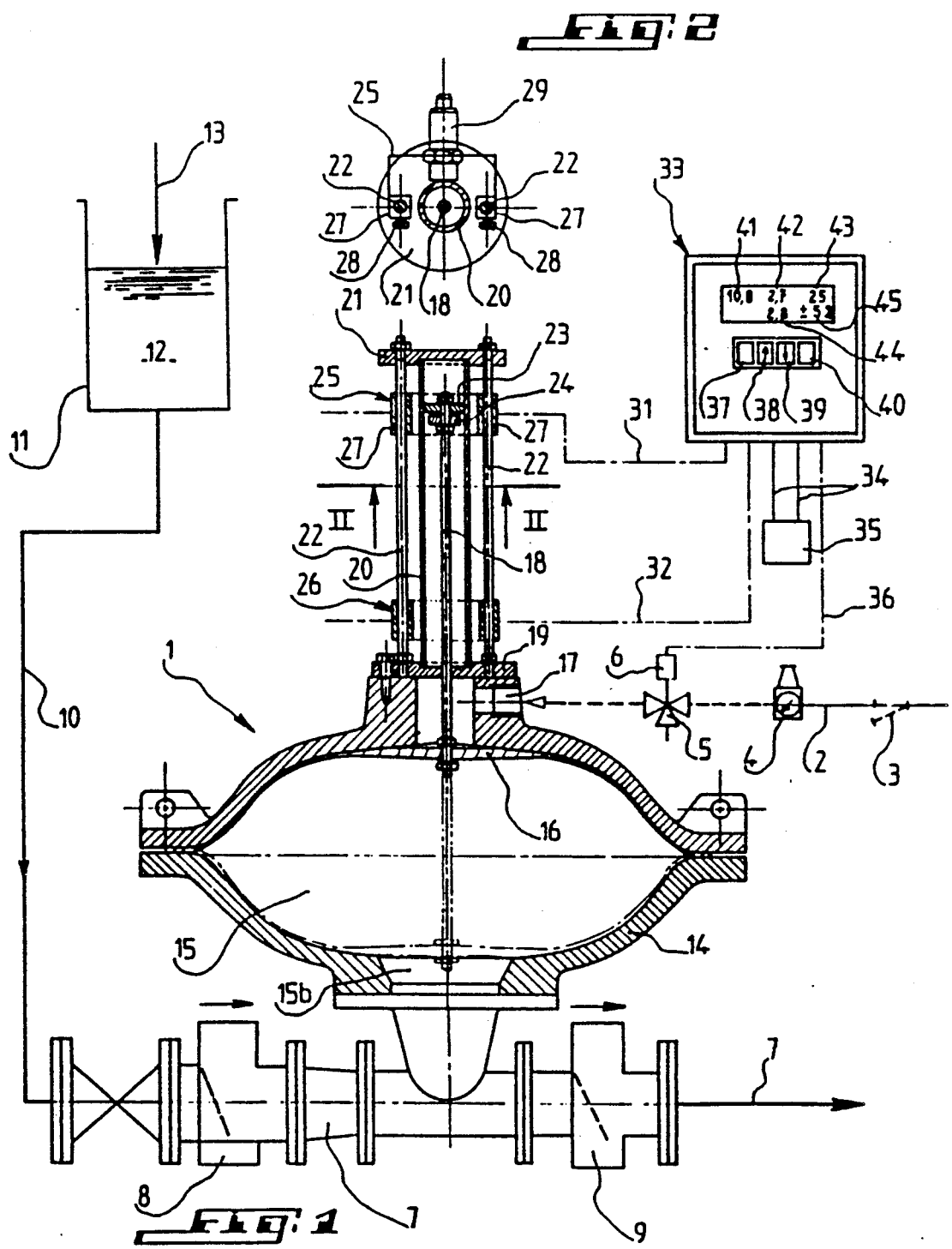

METHOD FOR PULP QUALITY CONTROL AND REGULATION

BACKGROUND OF THE INVENTION

The present invention relates to a method of qualitative and quantified monitoring of the instant local physical state of a substantially incompressible fluid material such as a liquid or pasty substance (for instance slurry or pulp) and a device for carrying out this method and the various applications and uses resulting from the working of the method and/or device for the automatic control of said physical state. The invention is also directed to the various equipment and systems provided with at least one such device.

In various industrial engineering processes liquid or pasty incompressible fluids such as sludges or pulps are used or produced which, after having undergone a previous elaborating or physical conditioning treatment, are carried or conveyed towards a place of subsequent utilization, consumption, treatment or transformation. In industrial facilities this transport is generally performed through pumping and flow circulation within pipelines or conduits. According to their nature, these fluids exhibit a physical state which may be variable locally with time and distance and which is a function of its instant local density and/or its viscosity and/or its solid matter content, these variable state parameters thus defining and characterizing the instant local consistency of the fluid. It is advantageous to know the instant local consistency of the fluid involved at its place of delivery, or of use so as to be able to monitor and ascertain variations thereof in order to correct them for obtaining a consistency of the desired quality.

There is already known from the prior Belgian Patent No. 902,161, (U.S. Pat. No. 4,705,462) a method consisting of selecting a desired volumetric flow rate, determining in accordance with the desired volumetric flow rate and the available pumping capacity a duration of the intake or filling and discharging or emptying cycle of a pumping chamber or enclosure. Thus, a predetermined time of cycle is set for emptying and filling the pump, with the pump caused to empty when the time of cycle has ended. In this known process a cycle time is employed which may be manually adjusted from time to time as required.

More specifically the prior U.S. Pat. No. 4,705,462 discloses a device comprising a volumetric pump with alternating filling or intake and emptying or discharge, with a driven positive-displacement impeller member performing a reciprocating motion and associated with a mechanical indicator movable between two opposite end positions corresponding to the end positions of intake and force strokes of said member. Associated with the mechanical indicator are position detectors or sensors, each capable of transmitting a signal indicating the presence of said indicator at an end position to a chronometrically adjustable system for operating the pump motor. The operation of the pump motor continues for the preset cycle time. The pump motor applies a constant thrust force to said impeller member for displacing the latter in the direction of delivery of fluid.

SUMMARY OF THE INVENTION

The method of the present invention is an improvement of the above-described method of U.S. Pat. No. 4,705,462 and consists in setting a reference discharge time corresponding to the desired state of consistency of the discharged fluid material and in correcting or cancelling any difference between the true and reference discharge times by comparing during each pumping cycle the measured instant true discharge time to the reference discharge time and, in accordance with the difference in discharge time detected, changing the pumping speed to restore the reference or desired discharge time and thereby restore the desired consistency of the fluid material.

The invention provides a method of control consisting in the determination of the instant local physical state of the fluid involved by the measurement of a physical value indicative of said state. Among the various physical values to be considered are the resistance to flow, the flow velocity, the volumetric flow rate as well as other kinematic and dynamic parameters to be determined under existing conditions.

The method of the invention comprises applying a predetermined head or pressure force to a known volume of the fluid material which is confined within a volume region of known dimensions to set the same in motion within that region and in measuring the time duration of overall displacement of said volume over a given distance between two points in its path of travel, this displacement time being representative of the average state of consistency of said volume of material.

It is another aspect of the invention that this determination of the displacement time is performed by the sensing of the successive passages of a mechanical indicator responsive to the motion of said fluid material at each of two points in its path of travel and by the measurement of the elapsed time between the sensing moments or signals.

More specifically, the aforesaid duration of displacement is the duration of emptying a chamber or enclosure of constant capacity forming the aforesaid volume region, filled with the fluid material and emptied through discharge of the contained finite volume of fluid material under the applied head outside of said enclosure.

The method of the invention may be practiced in a periodically intermittent or in a regular or irregular repeated continuous or discontinuous way.

The method of the invention is applicable for the continuous control of the fluid material in forced flow, displaced through pumping carried out within the aforesaid volume region and it is characterized by the measurement of the duration of each force stroke at a substantially constant discharge pressure.

Furthermore, the method is usable in a flow line of fluid material for maintaining a constant consistency through automatic control of at least one factor such as the instant speed or volumetric flow rate or power of pumping, pumping cycle time and/or the parameters of previous physical treatment or conditioning or elaboration of said material.

The method of the invention carries out a computerized processing of the data which can be stored, and programmed operations are achieved based upon various physical conditions of the aforesaid fluid material and/or other considerations such as the loads or forces exerted in upstream or downstream processes, levels of fluid material in tanks for storing the fluid material upstream for feeding the aforesaid pumping enclosure and/or downstream for receiving the delivered fluid material. In the invention, the pumping speed is controlled by the delivery time, the variation of which is programmable. To accomplish this end, the device of the invention incorporates an electronic regulator with a programmable microprocessor for accomplishing the aforesaid function while assuring essentially constant density of the fluid.

DESCRIPTION OF THE DRAWINGS

The invention will be better understood and further objects, characterizing features, details and advantages thereof will become more apparent as the following explanatory description proceeds with reference to the accompanying diagrammatic drawings given by way of non limiting example only illustrating a presently preferred specific embodiment of the invention and wherein:

FIG. 1 shows an overall view of the system according to the invention with a pump in vertical axial section mounted in a duct for circulating the fluid material to controlled;

FIG. 2 is a cross-section taken upon the line II—II of FIG. 1;

DETAILED DESCRIPTION

Figure 4:
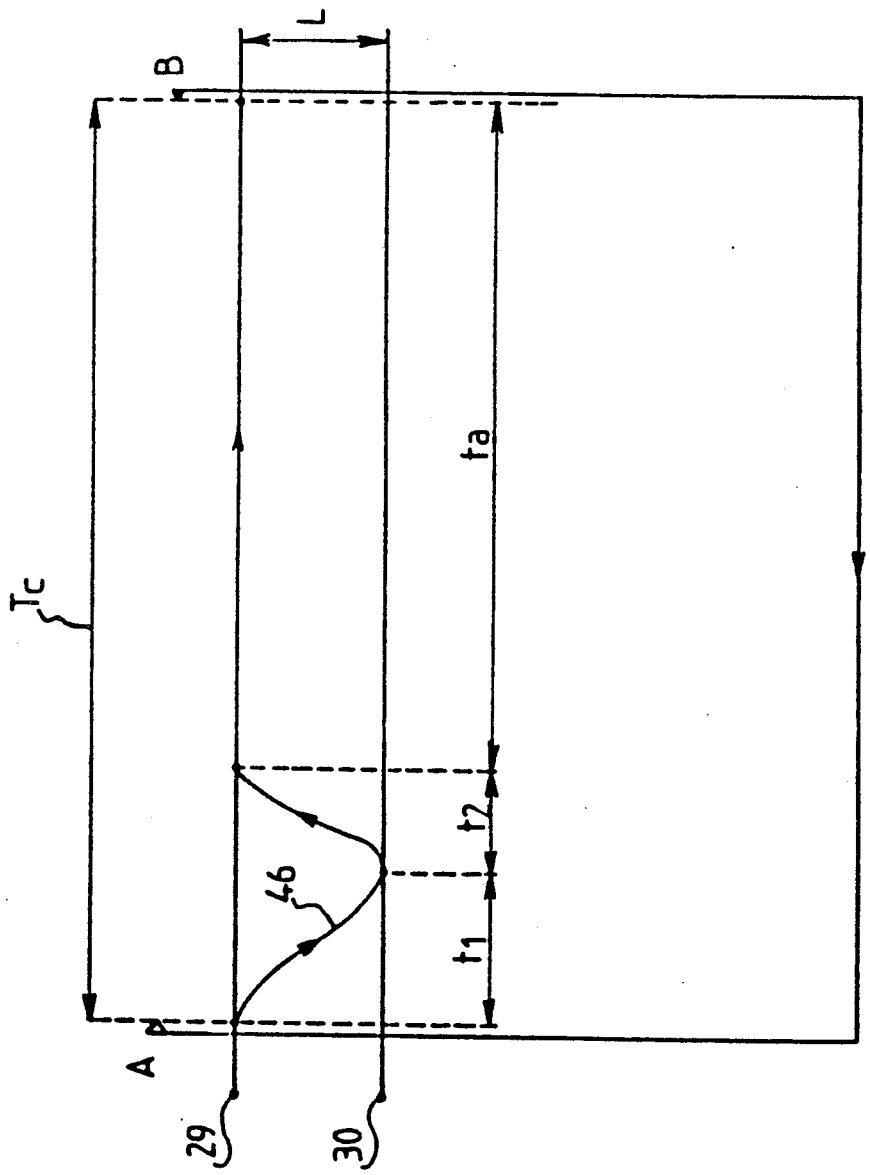
FIG. 4 is an explanatory diagram of the operation of the method according to the invention using said pump, this diagram being arranged in registering relationship with the pump of FIG. 3.

In more detail, the invention is applicable to the system of the prior U.S. Pat. No. 4,705,462, comprising a diaphragm pump filled under gravity load with fluid material and assisted during the intake stroke by a diaphragm drawback spring and with single delivery action by a power fluid under substantially constant pressure, for instance, compressed air. Alternate intake and exhaust of fluid is provided through an electromagnetic multiple-way valve actuated by a regulator electrically connected to two proximity sensors detecting the opposite stroke end positions of a metallic magnetizable metal body connected to said diaphragm. This process is characterized by the following successive operating steps accomplished under the control of the regulator during an operating cycle of the pump:

at the start of the cycle, sensing said metal body in the pump filling stroke end position;
simultaneously opening the compressed air inlet passage and closing the exhaust passage, respectively, of said electromagnetic valve for causing the pump to be emptied through forcing its content out;
sensing said metal body in the delivery stroke end position;
storing the emptying time for comparison with the previously adjusted reference or set delivery time;
simultaneously closing the compressed air inlet passage and opening the compressed air exhaust passage, respectively, of the electromagnetic valve to discontinue the intake of compressed air into the pump and exhausting the compressed air contained therein;
filling said pump through gravity with said fluid material;
sensing said metal body in the pump filling stroke end position;
delaying initiation of the second cycle for a time in accordance with the determinable emptying time;
at the cycle end, return to the initial operating step for simultaneous control of the closing of the exhaust passage and the opening of the inlet passage of the electromagnetic valve.

The aforesaid regulator comprises a keyboard for the selection of the physical input value (volumetric flow rate, delivery time, insensitivity or error range) to be stored, for adjusting the numerical value thereof in the increasing or decreasing direction for setting its reference or index value, and means for displaying or visually indicating said input values and the calculated cycle time and the true or measured delivery time.

The device may comprise alarm or warning means incorporated into the controller and signalling any flow conditions outside the range of device for adjustment as well as malfunctions likely to result in a misadjustment or defective operation, such as lockage of the intake valve.

This device may also be used as a sampling or test or pilot device mounted in an auxiliary conduit for bleeding or drawing off fluid material which is arranged in by-passing relationship with a main flow conduit or pipe-line of said fluid material. In this arrangement, the device can be used to actuate a control valve or other control-action device mounted in operative relation to a main conduit.

According to the exemplary embodiment shown on FIGS. 1 and 2 of the drawings the system according to the invention comprises a pneumatically operated pump designated in a general manner by the reference numeral 1 and adapted to be fed with power compressed air from a source of supply of compressed air (not shown) for instance under a substantially constant pressure of 4 bar by means of a feed and exhaust duct 2 successively through a filter 3, a pressure reducer 4 and a valve 5 electromagnetically operated by a solenoid 6 and adapted to put the pump 1 alternately in communication with the source of supply of compressed air and with the exhaust to the atmosphere.

The pump shown corresponds in particular to the one described and shown in the aforesaid prior U.S. Pat. No. 4,705,462. This pump is mounted in a pipeline 7 for the flow of a liquid or pasty fluid and in particular of a slurry or pulp between an upstream feed-check or back-pressure filling or intake valve 8 and a downstream feed-check or back-pressure emptying or delivery valve 9. The upstream valve 8 communicates through a duct 10 with a tank 11 for storing the sludge or pulp 12 exposed to atmospheric pressure 13 and located at a higher level than the pump so as to keep the latter under automatic filling load or head through the agency of the upstream valve 8.

The pump 1 comprises a hollow casing 14 the inner cavity 15 of which is subdivided by an intermediate flexible diaphragm 16 forming a partition wall movable through resilient strain into two overlying opposite chambers, namely an upper compressed air-receiving chamber 15a and a lower sludge-receiving chamber 15b, both adjacent chambers having capacities variable in opposite directions, respectively. The top chamber 15a is in communication through a port 17 of the pump casing with the adjacent portion of the duct 2 connected to that port whereas the bottom chamber 15b is in permanent communication with the pipe portion 7 located between both upstream and downstream valves 8, 9, respectively.

The pump is oriented so that the center plane of the pump casing containing the resilient diaphragm 16 in its neutral flat intermediate rest position is substantially horizontal and placed above the sludge-carrying piping 7. The diaphragm 16 is secured in the middle to a vertical rod 18 which extends upward from the diaphragm in sliding relationship through the top closure cover or cap 19 of the pump casing. The vertical rod 18 is thus more or less guided in the reciprocating vertical translatory motion imparted by the diaphragm 16. The rod portion 18, which is outside of the pump casing, projects into an upstanding cylindrical tube 20 substantially along the longitudinal center line axis thereof. This tube made from a non-magnetic material preferably is transparent to allow the visual observation of the displacement of the rod 18 from the outside and it is secured in fluid-tight sealed relationship onto the pump casing by being clamped through its opposite ends between the bottom cap 19 formed with a sunk facing to accommodate the bottom end of the tube and a top cover 21 also formed with a sunk facing to accommodate the top end of the tube closed by this cover, respectively, the tube 20 being clamped between the parts 19 and 21 by means of two parallel threaded brace rods or tie bolts 22 connecting the parts 19 and 21 and arranged symmetrically with respect to the longitudinal vertical center line axis of the tube 20, respectively, on either side of the tube and outside thereof.

The rod 18 is more or less centered and its upper end guided in the tube 20 by means of a crosswise extending washer or the like 23 secured at the top end of the rod 18 and in sliding engagement with the inner surface of the side wall of the tube 20. At the top end and below the washer 23 is secured a magnetizable metallic body 24 for instance shaped as a cylindrical disc with a diameter smaller than the inner diameter of the tube 20 so as to leave an annular clearance between the radially outer periphery of the body 24 and the inner wall of the tube 20.

On the pair of tie bolts 22 are secured in a selectively adjustable position two upper and lower supports 25 and 06, respectively, each one shaped as a substantially horizontal yoke encompassing the tube 20 with its parallel legs. The end of each side leg of each yoke 25, 26 is provided with a bushing or the like 21 through which extends a vertical hole, both bushes of a same yoke being thus threaded on both tie bolts 22.

Each support 25, 26 thus is displaceable vertically in sliding relationship on the tie bolts 22 and may be held against motion thereon in any relative position through clamping against the tie bolts by means of lock screws 28 screwed each one crosswise through the bushes 27 to come and pressed bearing engagement against the tie bolts 22. Each yoke 25, 26 carries on its cross-limb in the middle thereof a proximity detector switch 29, 30 (see FIGS. 2 and 3). Each proximity detector switch 29, 30 fastened in preferably adjustable relationship on its holder 25, 26, radially bears endwise of its sensing tip in sliding relationship against the surface of the outer side wall of the tube 20 thereby being located substantially in the diametrical longitudinal axial plane of this tube. The upper Yoke sensor-carrier 25 is positioned in stationary relationship on the tie bolts 22 so that its detector switch 29 is in front of the magnetizable metal body 24 at the top filling or intake stroke end position of the diaphragm 16 and of the rod 18. The lower yoke sensor-carrier 26 is positioned in stationary relationship on the tie bolts 22 at a location such that its detector switch 30 is in front of the magnetizable metal body 24 in the bottom emptying or discharge stroke end position of the diaphragm 16 and of the rod 18.

Both aforesaid proximity detector switches are connected through electric wire leads 31, 32, respectively, to an electronic timer controller 33 which is connected on the one hand through wire leads 34 to a source of supply of electric power 35 and on the other hand through an electric wire lead 36 to the electro-mechanical servo-motor of the valve 5 consisting of the actuator solenoid or electromagnet 6.

The regulator 33 carries on its outer side a panel comprising a keyboard and a display or visual indicator device. The keyboard comprises in particular the following push-buttons:

a push-button 37 for selecting the desired volumetric flow rate (expressed in m$^3$/h), the reference or set value of the delivery or emptying time and the insensitivity or relative error factor;

two push-buttons 38, 39 for, adjusting the aforesaid values in the increasing and decreasing directions, respectively;

a push-button 40 for enabling the aforesaid values to be entered or stored in the apparatus.

The display device comprises:

a window 41 for displaying the cycle time calculated by the controller (in this instance shown as 10.8 s);

a window 42 for displaying the actual or measured delivery time (in this case, 2.7 s);

a window 43 for displaying the desired volumetric flow rate (shown as 25 m$^3$/h);

a window 44 for displaying the reference or set value of the delivery time (here 2.8 s);

a window 45 for displaying the insensitivity or relative error factor (here the value is ±5%).

According to an alternative embodiment not shown in the drawings but corresponding to an embodiment described and shown in the prior U.S. Pat. No. 4,705,462, the rod 18 may comprise at an intermediate location of its length a stationary stop, which is adjustably positioned, and against which the top end of a compression coil spring threaded onto the rod abuts and the bottom end of which abuts the cover 19 of the pump casing. This coil spring preferably exhibits a slight initial compression prestress. During the delivery period when the diaphragm 16 moves downwards under the action of the compressed air it would carry along the rod 18 which thus compresses the spring until the diaphragm reaches its lower end position (shown in broken dash-dotted lines on FIG. 1) at the end of the discharge period, so that when the top chamber 15a is connected to the exhaust, the aforesaid spring would expand while exerting an upward biasing force on the rod 18 and the diaphragm 16 which thereby is automatically moved back into its upper end position (shown in solid lines on FIG. 1) during the filling period. This spring therefore exerts a positive upward force onto the diaphragm thereby additionally increasing the head load upon the bottom chamber 15b, so that the diaphragm would then exert an intake action upon the sludge from the beginning of the filling period.

Figure 3:
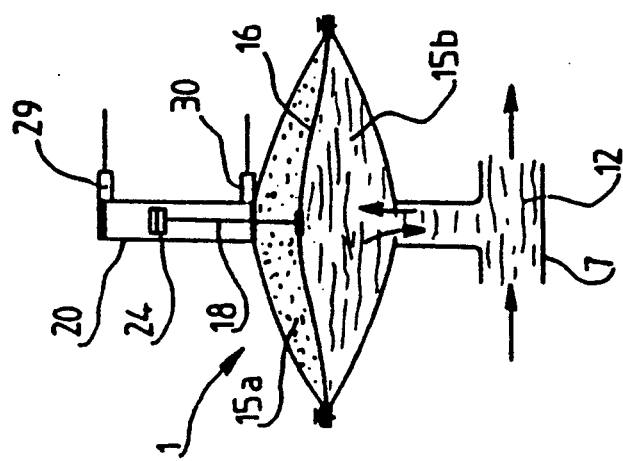
FIG. 3 shows a simplified diagrammatic basic sketch of said pump illustrating its operation.

FIGS. 3 and 4 illustrate the operation of the system according to the invention during a working cycle of the pump under the action of the regulator 33. FIG. 4 shows a curve 46 representing the displacement of the magnetizable body 24 (plotted in ordinates) as a function of time (plotted in abscissae). Each working cycle of the pump has a duration $T_c$ which varies in accordance with the consistency of the pumped slurry. This cycle time corresponds to the desired volumetric flow rate which has been entered and displayed hence stored into the controller 33. In general, this cycle time $T_c$ is at least equal to or greater than the sum of the respective durations of delivery or emptying $t_1$ and filling or intake $t_2$ successively carried out and which corresponds to the known pumping capacity of the pump involved. Thus, if the pump is operated in a continuous steady state fashion, it is likely to supply a volumetric flow rate greater than the desired volumetric flow rate, so that it would be necessary to operate the pump in a pulsed, intermittent or discontinuous fashion the cycle time of which would thus consist of a delivery or emptying time $t_1$, of a filling or intake time $t_2$ and of an idle or stand-by time $t_a$. The idle or stand-by time $t_a$ may be equal to zero, but in any case it follows the end of the filling or intake period and would thereby delay the following emptying or delivery period. The start of the cycle is symbolically designated by the reference character A and the cycle end is symbolically designated by the reference character B in FIG. 4. The curve 46 thus traces generally spaced or separated undulating portions between the horizontal straight lines 29 and 30 corresponding to the positions of the top and bottom detector switches 29 and 30, and vertically spaced by the length L of the stroke of the magnetizable body 24 and the diaphragm 16.

Figure 5:
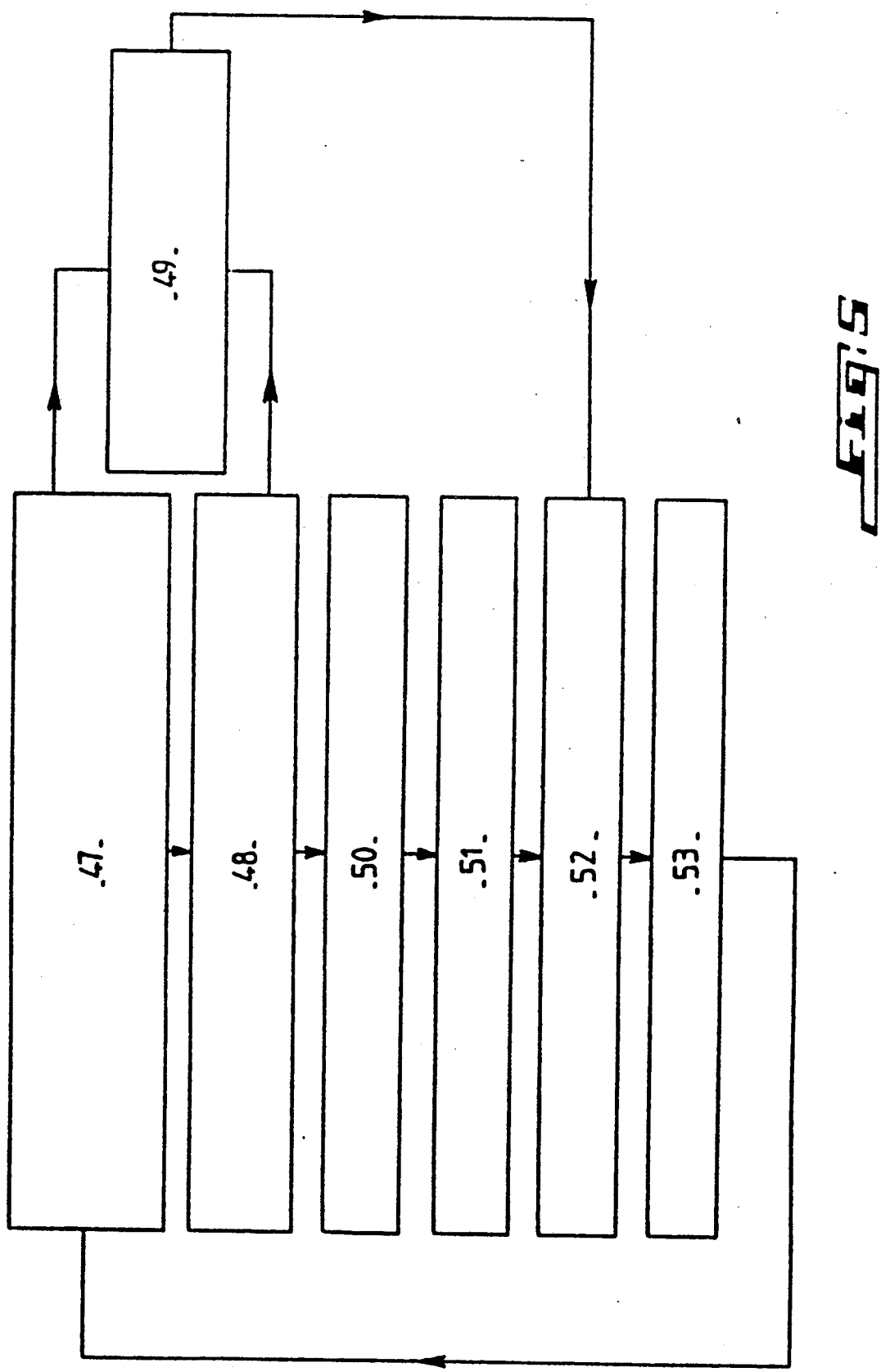
FIG. 5 shows a block diagram of the method of the aforesaid example in accordance with the invention.

The operation of this system according to the invention therefore is the following with reference to FIGS. 3 to 5. The operator at first enters the reference or set values of the desired volumetric flow rate and of the delivery or emptying time, respectively, corresponding to the desired consistency of the pumped sludge by acting upon the keys 37 to 40 of the keyboard, the entered or stored values being automatically displayed on the visualizing screen of the controller. The controller would then calculate the cycle time required for obtaining the displayed desired volumetric flow rate. At the start of the cycle the pump has been automatically filled through gravity with the sludge 12 fed from the tank 11, so that the diaphragm has thus been pushed into the upper end position and the metallic body 24 is located in front of the top detector switch 29 which would send a signal to the controller 33 which then operates through the medium of the servo-motor 6 the opening of the compressed air passage-way within the valve 5 for the inlet of compressed air into the top chamber 15a of the pump thereby causing the diaphragm 16 to move downwards while discharging the sludge to empty the pump (block 47 on FIG. 5).

At the bottom end of the stroke of the diaphragm the metallic body 24 has come in front of the bottom detector switch 30 which then would emit a signal to the controller 33 which actuates the closing of the compressed air passage-way and the simultaneous opening of the exhaust passage-way for the top chamber 15a of the pump within the valve 5 (block 48 on FIG. 5). At the same time the time period separating the signals emitted by the top and bottom detector switches 29 and 30, respectively, and representing the emptying or delivery time $t_1$, is measured and stored within the controller 33 for comparison with the set or reference value displayed on the controller (block 49 on FIG. 5).

As the diaphragm 16 rises during this exhaust, the bottom chamber 15b of the pump is being filled under gravity load with the sludge to be pumped during a period $t_2$ (block 50 on FIG. 5). This filling would end upon the arrival of the metal body 24 in front of the top detector switch 29 (block 51 on FIG. 5).

If the total duration of both consecutive delivery and filling periods $t_1$ and $t_2$ respectively, is smaller than the cycle time $T_c$ calculated by the controller in accordance with the instant consistency of the pumped sludge, the controller 33 would remain passive or inoperative for a stand-by period $t_a$ thereby stopping the operation of the pump for that period (block 52 on FIG. 5). When the calculated cycle time $T_c$ has lapsed the controller would become operative by starting again or repeating the aforesaid sequence of operating steps in the same order of succession for carrying out the next cycle (block 53 on FIG. 5)

If the desired delivery time is equal to the displayed reference time the pump will keep operating so as to deliver the volumetric flow rate which has been set. If the delivery time varies by deviating from its displayed reference or set value the controller would cause the pumping speed to change so as to cancel the difference found between the measured and reference delivery times, respectively, to restore the actual delivery time to its displayed reference value and this by overriding the signal representative of the volumetric flow rate thereby maintaining the desired quality of the slurry thus delivered (reaction or follow-up loop between blocks 49 and 52 on FIG. 5).

When using this arrangement for pumping purposes:
if the actual delivery time $t_1$ is equal to the reference or set delivery time, the cycle time $T_c$ would remain unchanged;
if the actual delivery time $t_1$ is longer than its reference or set value, the cycle time $T_c$ would decrease;
if the actual delivery time is shorter than its reference or set value, the cycle time would increase.

When using this system for test purposes:
if the measured delivery time is equal to its set or reference value, the control system would not react;
if the measured delivery time is longer or shorter than its set or reference value, the control system would act in one direction or in the reverse direction, respectively, upon the aforesaid valve or upon any other control member.

A regulator suitable for use in the invention is manufactured by PRODO SA of Brussels, Belgium.

Figure 6:
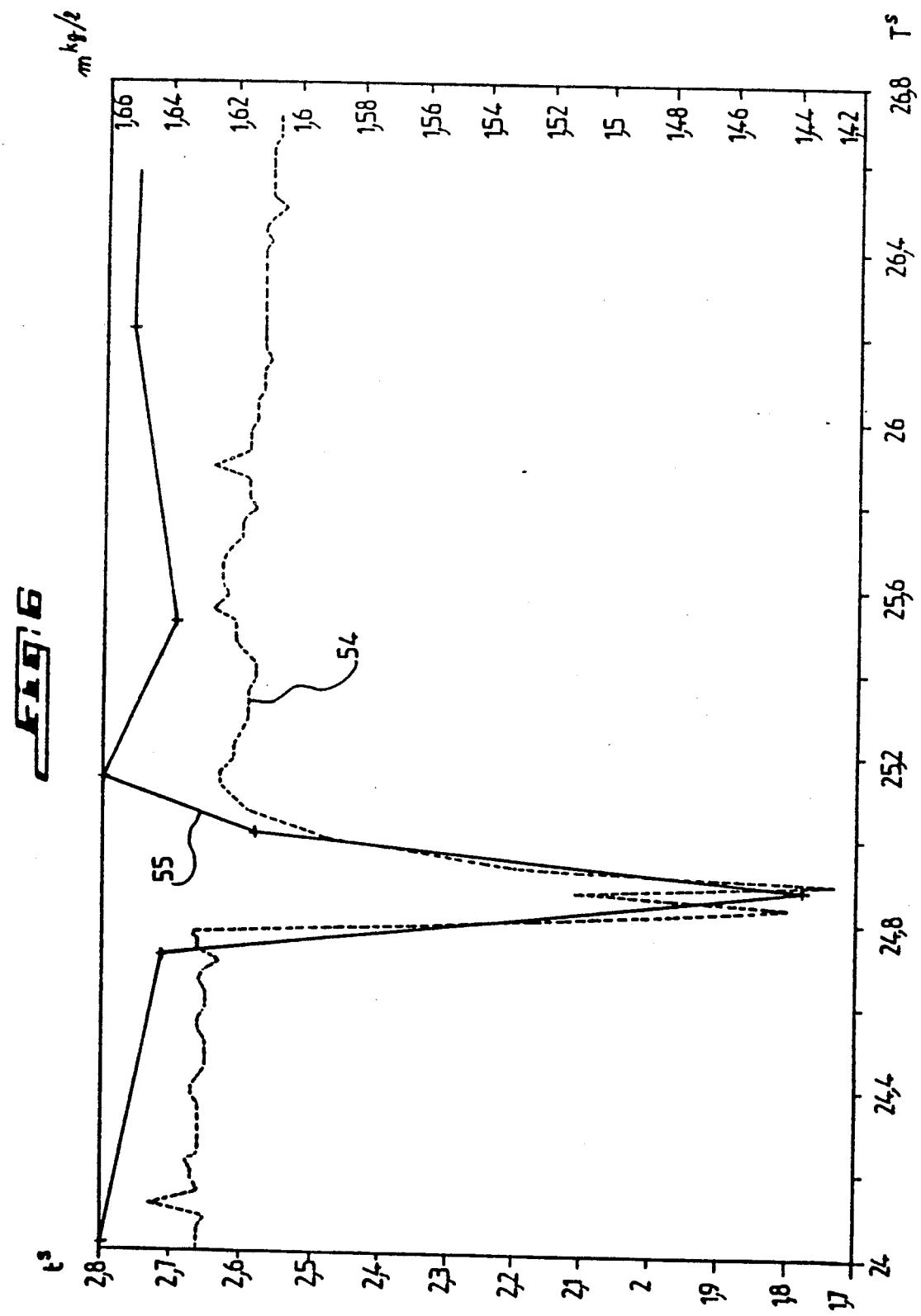
FIG. 6 shows a graphical plot, versus the cumulative operating time, of the variation on the one hand of the delivery time and on the other hand of the density or specific mass of the pumped sludge according to a typical particular example of application.

FIG. 6 shows a typical example of the correlation between the actual effective delivery time t (expressed in seconds and plotted in ordinates on the left-hand side) and the consistency, for instance the density or specific mass m (expressed in kg/1 and plotted in ordinates on the right-hand side) of the pumped slurry versus the cumulated operating time T (expressed in seconds and plotted in abscissae). This diagram results from the actual operation of a plant according to the invention for pumping gypsum sludge (grout or slurry) fed from a thickener. The curve 54 in dotted lines shows the variation in measured delivery time t and the curve 55 in solid lines shows the variation in density or specific mass m of the pumped sludge. This chart shows the response of delivery time to a disturbance in the density or specific mass of the pumped slurry.

Figure 7:
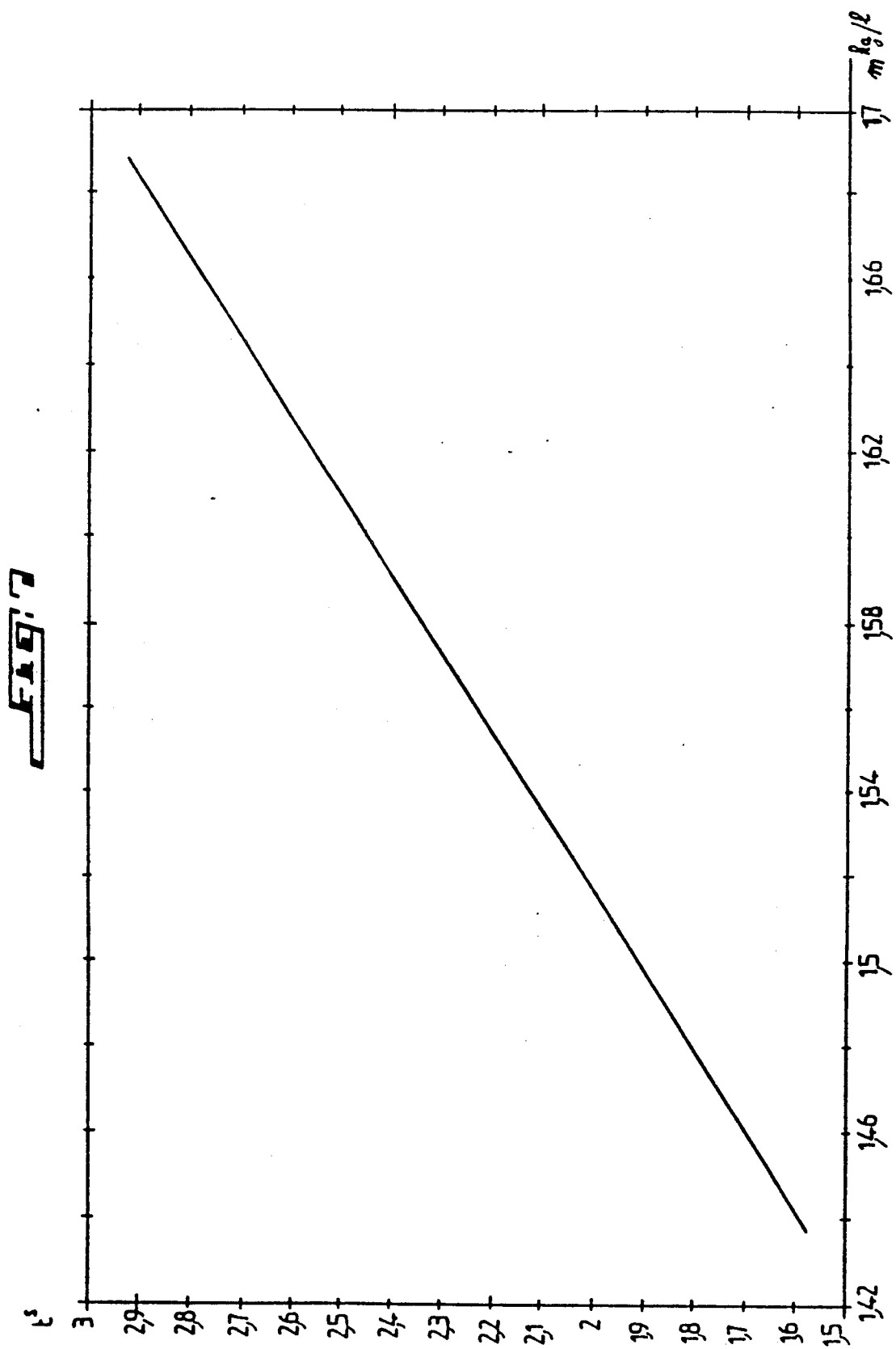
FIG. 7 is a graphical plot of the variation of the duration of delivery versus the density or specific mass of the slurry in the typical exemplary application.

FIG. 7 illustrates the variation in the pump delivery time t (as expressed in seconds and plotted in ordinates) versus the consistency and in particular the density or specific mass m of the sludge (as expressed in kg/l and plotted in abscissae) in a typical example in which an increment of 0.02 kg/l of the specific mass or density of the sludge discharged by the pump corresponds to an increase of 0.11 s of the discharge time. It is thus apparent that the discharge time t in seconds varies as an increasing linear function (shown by a straight line) of the density or specific mass m expressed in kilograms per liter.

If the device according to the invention is to be used only for the measurement of the consistency of said fluid material the accuracy of the measurement may be increased by decreasing the delivery pressure, i.e. the pressure of the drive pressure fluid such as compressed air since it then is possible to measure greater deviations.

As already stated hereinbefore the controller unit may be programmed so as to be capable of handling varying conditions such for instance as those exhibited by slurries that will only settle to lower solid matters content than normal. The controller would then act to accelerate the pump and if the delivery time does not decrease the pump would keep operating at high speed until the sludge has been discharged and the delivery time decreases.

The system herein described and shown is but one convenient means for examining the sludge in order to carry out a regulation of some parameters thereof and it should be understood that within the scope of the present invention the aforesaid device may be substituted for by any other suitable device through which the sludge to be treated is caused to flow. Thus the invention is not at all limited to the embodiment described and shown but is susceptible of modifications and variants obvious for anyone skilled in the art, thereby covering the means equivalent to the means described as well as their combinations within the scope of the appended claims.

I claim:

1. A method for control of the consistency of a slurry or pulp fluid material proceeding from a sedimentation zone or thickener tank, comprising establishing a reference displacement time for a known volume of said fluid moving under a constant force or head load through a known distance, the displacement time being representative of a desired average state of consistency of said fluid volume, thereafter passing a known volume of said fluid under a constant head through said known distance, measuring the an actual displacement time of said volume of fluid consumed in moving through said known distance, calculating the difference between said reference displacement time and the measured actual displacement time, and adjusting the volume of moving fluid or the prior physical conditioning or elaboration of said fluid material to maintain or restore the desired average state of consistency.

2. The method of claim 1 wherein the reference displacement time and the actual displacement time, are the duration of the discharge stroke of a pump.

3. The method of claim 2 wherein the adjustment to maintain the desired average consistency of the fluid material is accomplished by changing the pumping speed or pumping cycle time.

4. The method of claim 1, 2 or 3 wherein computerized processing of the data is carried out with storage thereof and programming of operating steps to maintain or restore the desired average state of consistency.

5. A method for control of the consistency of a slurry or pulp fluid material proceeding from a sedimentation zone or thickener through a pipe line to a place of utilization or further treatment in an intermittently pulsed flow imparted by a reciprocating positive displacement volumetric pump in the pipe line having constant intake and discharge strokes and operating under a constant delivery head load, comprising operating the pump with a preset pumping cycle frequency to provide a predetermined output flow rate, determining a reference discharge time for the pump representative of a desired average state of fluid consistency, measuring an actual discharge time for the pump on each discharge stroke, comparing the measured actual discharge time with the reference discharge time to determine the corresponding time difference and adjusting the pumping cycle frequency governing the flow rate in the pipe line, or selectively varying the physical state in the sedimentation zone or thickener to alter the consistency of said fluid, until said time difference has been reduced sufficiently to restore the actual discharge time to correspondence with the reference discharge time and thereby reestablish the average state of fluid consistency in the pipe line.

6. A method according to claim 5, consisting in an automatic feedback control through computerized processing of stored data and programming of operating steps to maintain or restore the desired average state of consistency in said pipe line.

* * * * *